(12) United States Patent
Chang et al.

(10) Patent No.: US 7,218,365 B2
(45) Date of Patent: May 15, 2007

(54) BI-DISPLAY MODE LIQUID CRYSTAL DISPLAY

(75) Inventors: Pin Chang, Toufen Township, Miaoli County (TW); Cheng Lian Liu, Toufen Township, Miaoli County (TW); Chun Yu Chao, Toufen Township, Miaoli County (TW)

(73) Assignee: Giantplus Tehcnology Co., Ltd., Miaoli County (TW)

( * ) Notice: Subject to any disclaimer, the term of this patent is extended or adjusted under 35 U.S.C. 154(b) by 237 days.

(21) Appl. No.: 10/894,011

(22) Filed: Jul. 20, 2004

(65) Prior Publication Data
US 2005/0057711 A1    Mar. 17, 2005

(30) Foreign Application Priority Data
Sep. 12, 2003    (TW) ............... 92216432 U (51) Int. Cl.
*G02F 1/1335*    (2006.01)
(52) U.S. Cl. .............. 349/114; 349/106; 349/119; 349/122
(58) Field of Classification Search .......... 349/96, 349/106, 113, 114, 119, 123, 122, 167, 177, 349/179; 345/88
See application file for complete search history.

(56) References Cited

U.S. PATENT DOCUMENTS 6,825,902 B2 *  11/2004  Kaneko ................ 349/114
6,909,479 B2 *   6/2005  Iijima ................. 349/109

* cited by examiner

*Primary Examiner*—Toan Ton
*Assistant Examiner*—Tai Duong
(74) *Attorney, Agent, or Firm*—Rosenberg, Klein & Lee (57) ABSTRACT

A bi-display mode liquid crystal display comprises a top and a bottom transparent substrate that are arranged in a parallel way, and between the two transparent substrates are a liquid crystal layer, a semi-reflector and a color filter sequentially, in addition, a top and a bottom polarizer are set on the outer surface of the top and the bottom transparent substrate respectively; by setting the semi-reflector upon the color filter, it makes the light not pass through the color filter and increase the reflection rate. Therefore, the present invention not only provides a reflective mode of high brightness gray scale display, but has a transmissive mode of beautiful color, and has the advantage of power saving and easy to use.

20 Claims, 7 Drawing Sheets

Fig.5

BI-DISPLAY MODE LIQUID CRYSTAL DISPLAY

BACKGROUND OF THE INVENTION

1. Field of the Invention

The present invention relates to a liquid crystal display (LCD), especially relates to a semi-reflective liquid crystal display module that meets the requirements of high brightness and color under the gray scale and color scale display mode.

2. Description of the Prior Art

It is known that traditional colorful liquid crystal display shows by the usage of the light from its environment under reflective mode, and it shows by the usage of the light provided by the backlight system under transmissive mode, which is named transmissive display.

Figure 1:
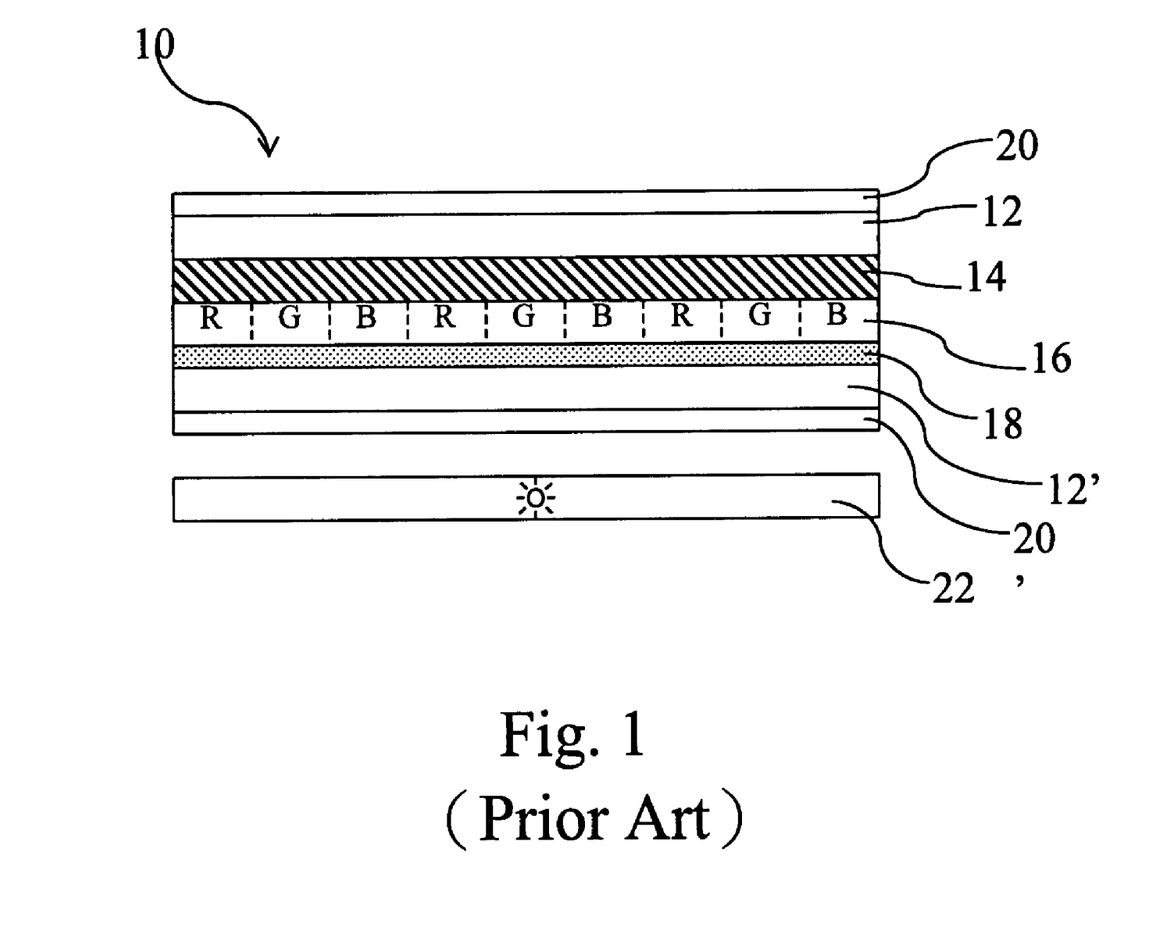
FIG. 1 is a diagram of the structure of known semi-reflective liquid crystal display.

The structure of known semi-reflective liquid crystal display is shown in FIG. 1, wherein a liquid crystal display 10 includes a top and a bottom glass 12, 12', which are arranged in a parallel way; between the relative surfaces of the top galss 12 and the bottom glass 12' are a liquid crystal layer 14, a color filter 16 and a semi-refletcor 18, and a top polarizer 20 and a bottom polarizer 20' are covered on the outer surface of the top glass 12 and bottom glass 12' respectively. In addition, a backlight system 22 is set at the back light position of the semi-reflector 18. By turning on the backlight system, makes the backlight transmits through the top polarizer, which is known as transmissive display. While the backlight system is off, the liquid crystal display shows by reflecting the light, which is known as reflective display. The mentioned display styles are the principle of semi-reflective liquid crystal display that has already applied to the display panel of colorful mobile phone.

However, the structure of the liquid crystal display 10 which sets the semi-reflector 18 under the color filter 16 as mentioned causes the high energy loss of the reflected light because light from the outside world is reflected by the semi-reflector 18 when the backlight system 22 is off and the mobile phone is under reflective mode while it is standby, therefore the light has to pass the color filter 16 twice, and the transmittance is limited. And it makes the reflection rate of colorful mobile phone is quite lower than monochrome one which also causes the bad displaying outcome when the colorful mobile phone is standby under dark environment. To raise the reflection rate of colorful displays, known technologies always lower the color selectivity of the color filter 16, however, it always decreases the color gamut on the contrary and cannot give consideration to high reflection rate and color at the same time. Besides, the information users need to know is time, capacity of the battery and the like while the phone is standby, which can be achieved only by the reflective mode of the monochrome display. Due to the bad display, users always have to turn on the transmissive mode and touch off the back light to increase the brightness, which not only shortens the using time of the battery, but also makes frame viewing difficult, therefore it is not user-friendly.

To solve the problem, the invention provides a bi-display mode liquid crystal display according to the defects of the known art, to make the display meet the requirements of high reflection rate and highly colorful presentation.

SUMMARY OF THE INVENTION

The main purpose of the present invention is to provide a bi-display mode liquid crystal display by setting the semi-reflector of colorful display on the color filter, which makes the reflective light not pass through the color filter under reflective mode and under the prerequisite of not lowering the color gamut of the color filter, has the benefits of high reflection rate of monochrome mode and high color of the transmissive mode therefore can overcome the defect of known art.

Another purpose of the present invention is to provide a bi-display mode liquid crystal display that provides a clear and high brightness gray scale display by using reflective mode while it is standby and the frame of it can be clearly viewed under general environment without turning on the back light and further has the advantage of low electricity requirement and convenient to use.

Another purpose of the present invention is to provide a bi-display mode liquid crystal display in which a semi-reflector is set on both sides of the color filter and a plurality of windows are set at the semi-reflector, which makes the light pass through the windows concentrated and increases the brightness of transmissive mode by raising the total amount of light and lowering the energy loss of light.

According to the invention, a bi-display mode liquid crystal display includes a top and a bottom transparent substrate which are arranged in a parallel way; between the two transparent substrate is a liquid crystal layer and there are a semi-reflector and a color filter between the liquid crystal layer and the bottom transparent substrate sequentially, besides, a top and a bottom polarizer are set on the outer surface of the top and the bottom transparent substrate respectively.

In addition, there is a first transparent electrode layer under the top transparent substrate and under the first transparent electrode layer is a first alignment film; under the first alignment film is the liquid crystal layer and there is a second alignment film under the liquid crystal layer and a second transparent electrode layer is set under the second alignment film; under the second transparent electrode layer is the color filter and the bottom transparent substrate is set under the filter; under the color filter is the bottom transparent substrate and the semi-reflector can be set either above or under the second transparent electrode layer.

In addition, while the semi-reflector is set above the second transparent electrode, there are a plurality of first apertures.

In addition, when the semi-reflector is set under the second transparent electrode layer, it is between the color filter and the bottom transparent substrate and the semi-reflector has a plurality of first apertures. Besides, the color filter has a plurality of first color block apertures that are arranged in a crisscross way with the plural first apertures. Following are the embodiments with detailed descriptions of the drawings to make it easier to understand the purpose, content, characteristic and the efficacy that the invention intend to achieve.

DETAILED DESCRIPTION OF THE PREFERRED EMBODIMENTS

The invention puts the semi-reflector of the colorful liquid crystal display that has a reflective mode and a transmissive mode above the color filter and by using that the reflective light won't pass through the color filter under the reflective mode display, lowers the loss of light and provides a clear gray scale display.

Figure 2:
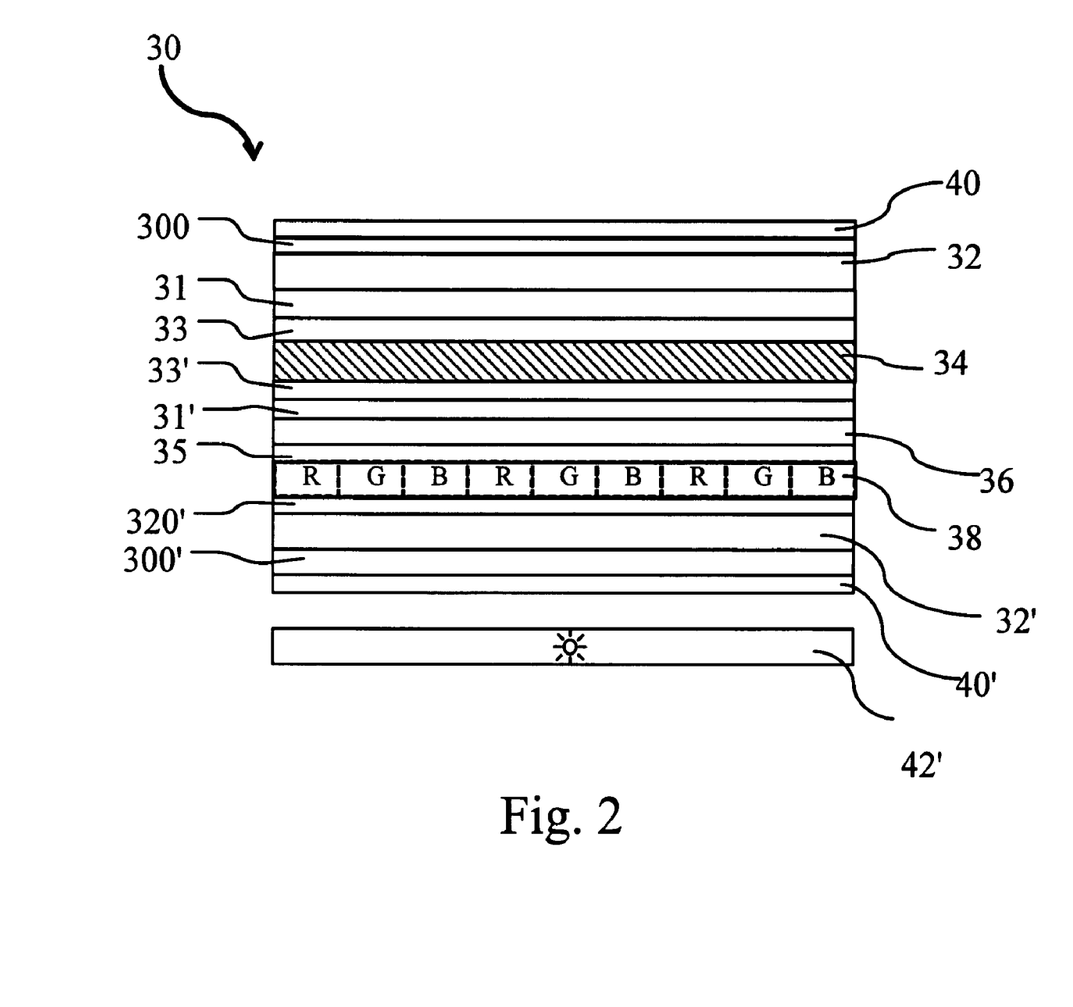
FIG. 2 is a diagram of the structure of present invention.

As shown in FIG. 2, which is the structure diagram of bi-display mode liquid crystal display of the present invention. A liquid crystal display 30 includes a top and a bottom transparent substrate 32, 32' that are arranged in a parallel way; usually, the top and the bottom transparent substrate 32, 32' are made of glass. Between the top and the bottom transparent substrate 32, 32', there are a liquid crystal layer 34, a semi-reflector 36 and a color filter 38 sequentially. The liquid crystal layer 34 shows images by the passed light while the liquid crystal molecules are turned by the driving of electric field; the reflection rate of the semi-reflector 36 is between 15% and 95% which provides the reflection of the incident light and the transmission of the back light source. The color filter 38 is practically composed of the arrangement of small blocks of a plurality of red, green and blue three primary colors and it produces the desired light by absorbing the wavelength not in desire; there is a top and a bottom polarizer 40, 40' set on the outer surface of the top and the bottom transparent substrate 32, 32' respectively to polarize the light while it passes through the top and the bottom polarizer 40, 40'; at the back light position of the color filter 38 and under the bottom polarizer 40' is a backlight system 42 for providing back light. Wherein the polarizer 40, 40' usually means without specific reference the assembly of essential retardation film and the polarizer and in which the first retardation film 300 is set between the top transparent substrates 32 and the top polarizer 40 while the second retardation film 300 is between the bottom transparent substrate 32' and bottom polarizer 40', which are the arts already known so won't be discussed too detailed here.

Also, the liquid crystal layer 34 is usually super twisted nematic (STN) structure, twisted nematic or bistable nematic (BiNem) structure, in which it includes a first transparent electrode layer 31 and a second transparent electrode 31' which are arranged in a parallel way and face to the inner side of the top and bottom transparent substrate; the commonly used electricity conducting substance is Indium Tin Oxide (ITO) and there are a first alignment film 33 and a second alignment film 33' set on the relative surface of the first and second transparent electrode layer 31, 31'; the commonly used electricity alignment film is polyimide (PI) coating and there is a liquid crystal molecule layer set between said two alignment layers for generating the directional change of the liquid crystal molecule by using the two transparent layers 31, 31' as transparent electrodes. Because the transparent electrode layer and the alignment film are all the detail of the known arts, it is omitted here. Besides, an active driving element for driving each display color block could be set under the top transparent substrate 32 or above the bottom transparent substrate 32', and the commonly used one is thin-film transistor (TFT) element 320'.

After understanding the structure of the invention, following is the detailed description of the mechanism of the bi-display mode liquid crystal display 30 under reflective mode and transmissive mode. Under the reflective mode, light from outside world will pass through the top polarizer 40 and be polarized by it, the polarized light will then pass through the top transparent substrate 32 and the liquid crystal layer 34, after being changed the state of polarization by the twist of liquid crystal molecules. (The polarization state is usually circular polarization state) When the light arrives at the semi-reflector 36, part of light will be reflected by the semi-reflector 36 and the reflected light will also pass through the liquid crystal layer 34, top transparent substrate 32 and part of the light can pass through them by the polarization of the top polarizer 40; wherein the arrangement of the liquid crystal molecules are changed by the voltage variation caused by the transparent electrode and therefore changes the polarization state of the polarized light passing through the liquid crystal layer 34; because different state of polarization has different strength of the light, it can achieve the function of controlling brightness and darkness. Therefore, the liquid crystal display 30 can use the reflection of the light outside to display the images under the reflective mode without turning on the backlight system 42 and have an advantage of power saving and extending the standby time of battery; in the meantime, because the semi-reflector 36 is set above the color filter 38 in the present invention, the reflective light will not pass through the color filter 38 and will not be absorbed by it under the reflective mode, therefore it has the efficacy of high reflection rate.

On the other hand, under the transmissive mode the back light from the backlight system 42 will be polarized while it passes through the bottom polarizer 40' wherein the polarization state is usually designed in a circular polarization state; the polarized light will then pass through the bottom transparent substrate 32' and the color filter 38; and by the action of red, blue and green three pixels of the color filter, the polarized light will show different pixels by the absorption of the color blocks of color filter 38; part of the light behind will then pass through the semi-reflector 36 and the liquid crystal layer 34, and the passing light will then pass through top transparent substrate 32 and top polarizer 40 by the different polarization state caused by the alignment of liquid crystal molecules; and the light passes at last forms the various colorful images and figures.

Therefore, the present invention has the advantages of high reflection rate and beautiful color under the prerequisite of not lowering the color gamut of the color filter. When it is standby, provides a clear and bright display of gray scale by the reflective mode and can be viewed clearly in a common environment without turning on the backlight system that further provides an advantage of low power consumption and easy to use; while under the transmissive mode it can provide a colorful display with beautiful color by the back light provided by the backlight system and doesn't have to decrease the color gamut of the reflective mode like prior art.

Figure 3:
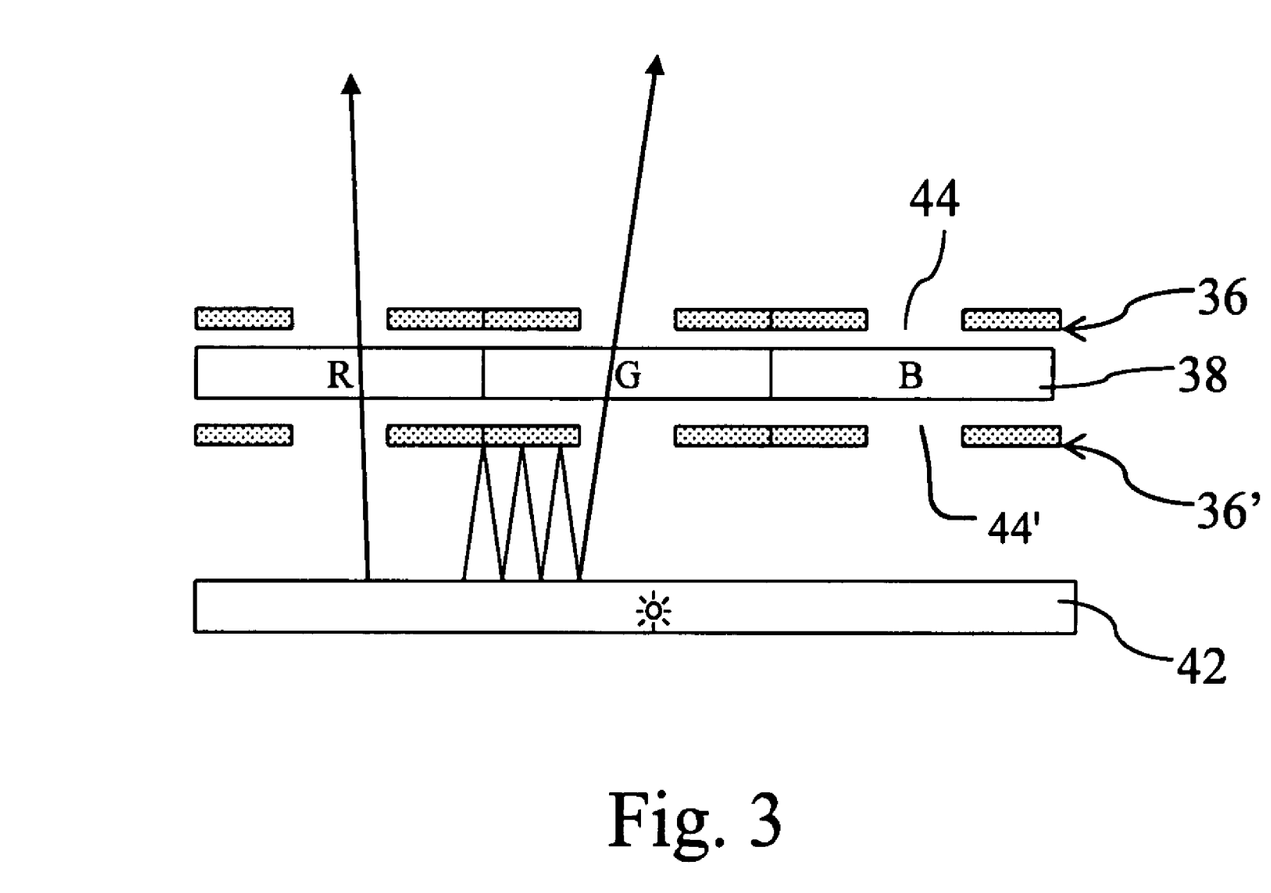
FIG. 3 is a diagram of the partial structure of another embodiment of the invention.

Besides, please refer to FIG. 3, which is a structure diagram of another embodiment of the invention; the structure of the liquid crystal display 10 is similar to the structure shown in FIG. 2 and the difference is that this one brings about the reflector 36 by using the windows on the reflector; there is a semi-reflector 36 above the color filter 38 and another similar semi-reflector 36' is set under the color filter 38, in addition, the reflective side of the semi-reflector 36' faces to the backlight system 42; there are a plurality of corresponding first and second windows 44, 44' at the reflective side of the top and bottom semi-reflector, which makes the light of the backlight system 42 pass through the first windows 44 and the second windows 44' directly or pass through windows 44 after a constant reflection (absorption) between the semi-reflector 36' and the backlight system 42; by decreasing the area of color filter that light passes through and making the light not pass through the semi-reflector 36, 36', it can increase the total amount of light and lower the energy loss when the light passes through the semi-reflector, therefore it enhances the efficiency of the brightness of transmissive mode.

Figure 4:
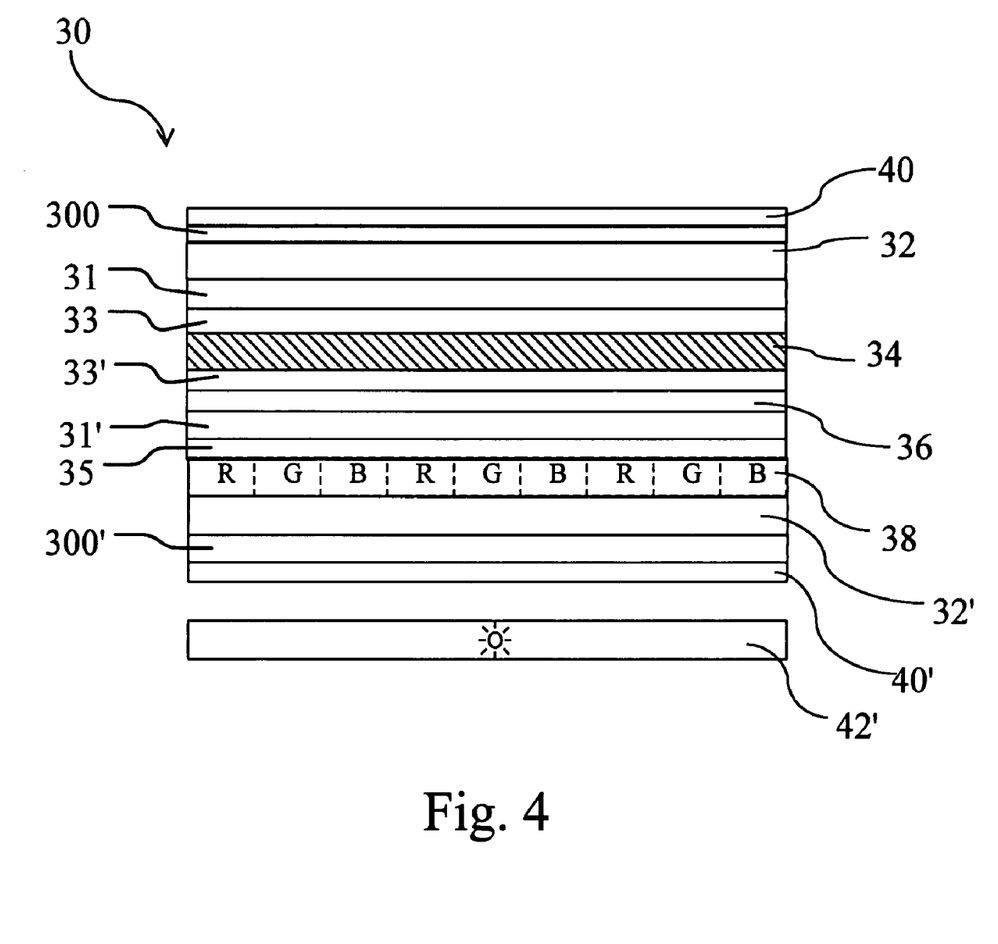
FIG. 4 is a diagram of the structure of the arrangement of semi-reflector of another embodiment of present invention.

In addition, please refer to FIG. 4, which is another preferred embodiment of the semi-reflector of present invention. Also please refer to FIG. 2 in which there is a first transparent electrode layer 31 under the top transparent substrate 32 and under the first transparent electrode layer is a first alignment film 33; under the first alignment film 33 is the liquid crystal layer 34 and there is a second alignment film 33' under the liquid crystal layer 34 and a second transparent electrode layer 31' is set under the second alignment film 33'; under the second transparent electrode layer 31' is a cover coat 35 and under the cover coat 35 is the color filter 38 with the bottom transparent substrate 32' set under it; the semi-reflector 36 is set between the second transparent electrode layer 31' and the cover coat 35 in the embodiment and in another embodiment the semi-reflector 36 can be set between the second transparent electrode layer 31' and the second alignment film 33'.

Figure 4A:
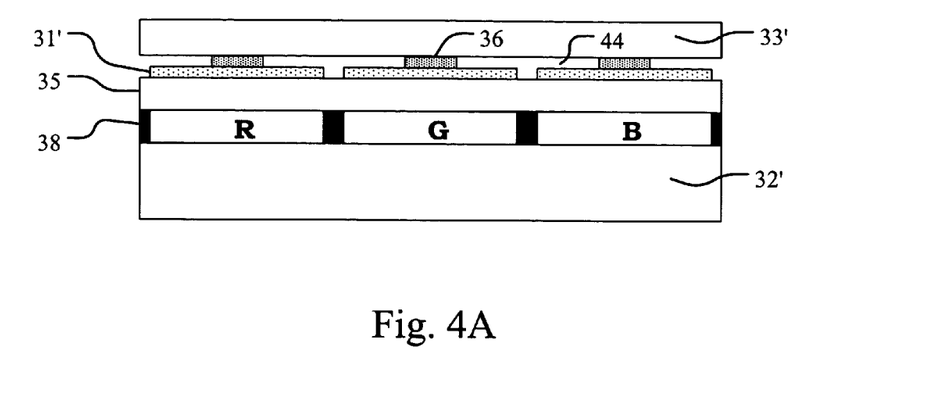
FIG. 4A is a diagram of the structure of the arrangement of semi-reflector of another embodiment of present invention.
Figure 4B:
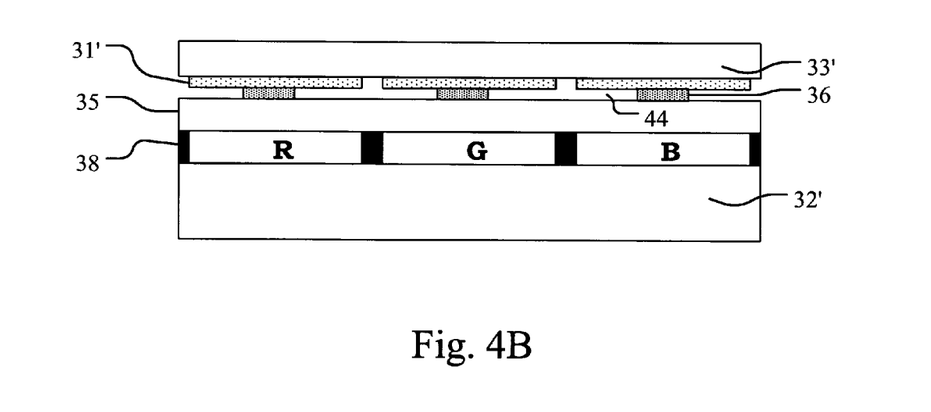
FIG. 4B is a diagram of the structure of the arrangement of semi-reflector of another embodiment of present invention.
Figure 4C:
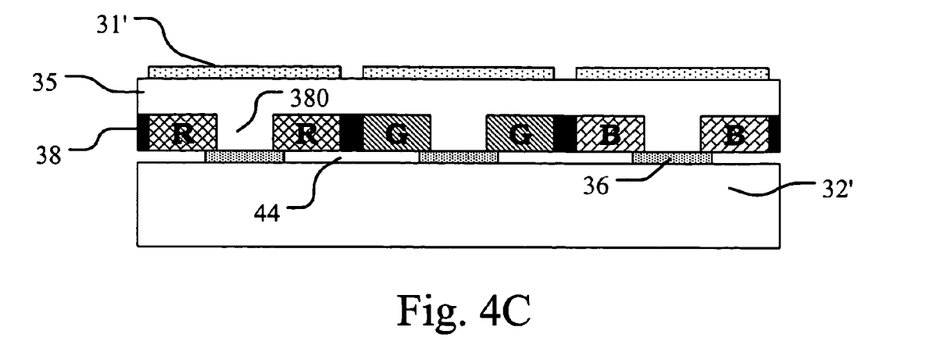
FIG. 4C is a diagram of the structure of the arrangement of semi-reflector of another embodiment of present invention.
Figure 4D:
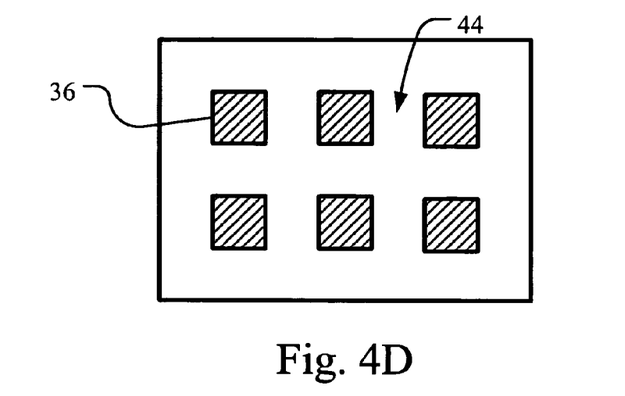
FIG. 4D is a diagram of the structure of semi-reflector of an embodiment of present invention.
Figure 4E:
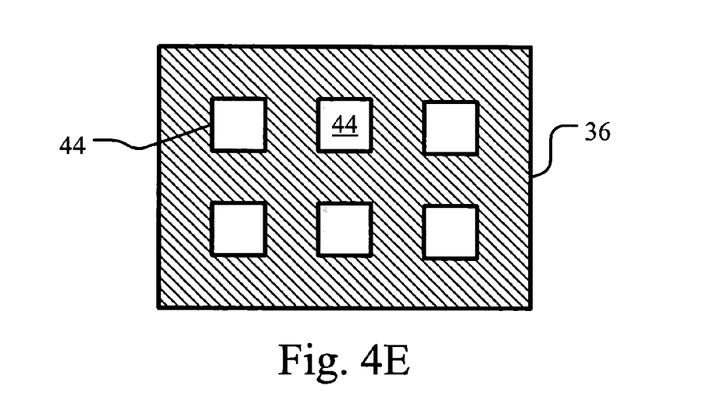
FIG. 4E is a diagram of the structure of the semi-reflector of another embodiment of present invention.

Besides, please refer to FIG. 4A, which is another preferred embodiment of the semi-reflector of the present invention, wherein the semi-reflector 36 is set between the second transparent electrode layer 31' and the second alignment film 33' or between the second transparent electrode layer 31' and the cover coat 35 (please refer to FIG. 4B); there are a plurality of first apertures 44 in the semi-reflector 36 and the semi-reflector 36 is the block of total internal reflection of a multilayer dielectric reflector or a thin film metal reflector. The vertical view of the semi-reflector 36 could be FIG. 4D or FIG. 4E. In addition, please refer to FIG. 4C, which is another preferred embodiment of the semi-reflector of present invention; the semi-reflector 36 is set between the color filter 38 and the bottom transparent substrate 32', and the semi-reflector 36 has a plurality of first apertures 44; the color filter 38 has a plurality of color block apertures 380 and the plural color block apertures are crisscross arranged with the plural first apertures; the semi-reflector 36 is the block of total internal reflection of a multilayer dielectric reflector or a thin film metal reflector.

Figure 5:
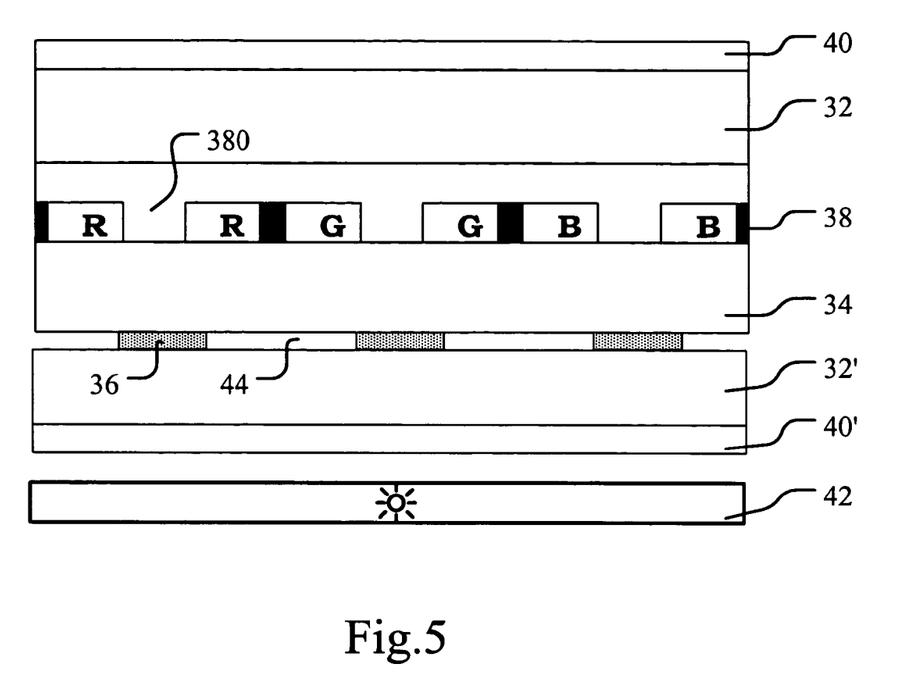
FIG. 5 is a diagram of the structure of another embodiment of present invention.

Lastly, please refer to FIG. 5, which is another preferred embodiment of the invention; one of the bi-display mode liquid crystal displays of the present invention provides reflective mode and transmissive mode display, and the liquid crystal display includes a top and a bottom transparent substrate 32, 32', a semi-reflector 36, a color filter 38, a top and a bottom polarizer 40, 40' and a backlight system 42. Wherein the top and the bottom transparent substrate 32, 32' are arranged in a parallel way an between the two transparent substrates 32, 32' is a liquid crystal layer 34; the semi-reflector 36 is set between the liquid crystal layer 36 and the bottom transparent substrate 32'; the color filter 38 is set between the liquid crystal layer 34 and the top transparent substrate 32; the top and the bottom polarizer 40, 40' are set on the outer surface of the transparent substrate 32, 32' respectively; the backlight system 42 is set at the back light position of the color filter 38.

Besides, there are a plurality of first apertures 44 in the semi-reflector 36 and a plurality of color apertures 380 in the color filter 38 which are corresponding to the plural first apertures 44 of the semi-reflector 36 and crisscross arranged with each other; in addition, the semi-reflector 36 is the block of total internal reflection of a multilayer dielectric reflector or a thin film metal reflector.

Things mentioned above are the illustration of the characteristics of the invention and the purpose is to make person skilled in the art understand the invention and enable to bring it into practice, rather than a limitation of the scope of the invention, therefore, any equivalent modification or amendment under the spirit of the invention disclosed should still be inside the following claims.

What is claimed is:

1. A bi-display mode liquid crystal display that provides a reflective mode and a transmissive mode display, said liquid crystal display comprising:
   a top and a bottom transparent substrate disposed in spaced parallel relationship;
   a liquid crystal layer disposed between the top and bottom transparent substrates;
   a color filter placed between the liquid crystal layer and the bottom transparent substrate;
   a semi-reflector disposed between the liquid crystal layer and the color filter for transmission of light passed through the color filter and reflection of light passed through the top transparent substrate from external the liquid crystal display without passing through the color filter;
   a top and a bottom polarizer respectively set on the outer surface of the top and the bottom transparent substrates; and
   a backlight system disposed below the bottom transparent substrate, wherein the reflective mode provides a gray scale display and the transmissive mode provides a color scale display.

2. The bi-display mode liquid crystal display as claimed in claim 1, wherein said liquid crystal layer further comprises a first transparent electrode layer above the liquid crystal layer and a second transparent electrode layer located below the liquid crystal layer.

3. The bi-display mode liquid crystal display as claimed in claim 1, wherein said transparent substrate is made of glass material.

4. The bi-display mode liquid crystal display as claimed in claim 1, which further comprises an active driving element for driving each color blocks of the color filter.

5. The bi-display mode liquid crystal display as claimed in claim 1, wherein said liquid crystal layer is a super twisted nematic (STN), twisted nematic (TN) or bistable nematic (BiNem) structure.

6. The bi-display mode liquid crystal display as claimed in claim 1, wherein the reflection rate of said semi-reflector is between 15% and 95%.

7. The bi-display mode liquid crystal display as claimed in claim 1, wherein a plurality of windows are formed through said semi-reflector.

8. The bi-display mode liquid crystal display as claimed in claim 1, which further comprises two retardation films set between the top and the bottom polarizer and between the two transparent substrates respectively.

9. The bi-display mode liquid crystal display as claimed in claim 2, which further comprises a first alignment film set between the first transparent electrode layer and the liquid crystal layer and a second alignment film set between the second transparent electrode layer and the liquid crystal layer.

10. The bi-display mode liquid crystal display as claimed in claim 2, which further comprises a cover coat set between the second transparent electrode layer and the color filter.

11. The bi-display mode liquid crystal display as claimed in claim 9, wherein the semi-reflector is between the second alignment film and the second transparent electrode layer.

12. The bi-display mode liquid crystal display as claimed in claim 10, wherein the semi-reflector is between the cover coat and the second transparent electrode layer.

13. The bi-display mode liquid crystal display as claimed in claim 7, wherein the semi-reflector that contains a plurality of windows is located between the second transparent electrode layer and the second alignment film.

14. The bi-display mode liquid crystal display as claimed in claim 10, wherein the semi-reflector that contains a plurality of windows is located between the second transparent electrode layer and the cover coat.

15. The bi-display mode liquid crystal display as claimed in claim 7, wherein the semi-reflector is formed of a multilayer dielectric reflector or a thin film metal reflector.

16. A bi-display mode liquid crystal display that provides a reflective mode and a transmissive mode display, said liquid crystal display comprising:

a top and a bottom transparent substrate disposed in spaced parallel relationship;

a liquid crystal layer disposed between the top and bottom transparent substrates;

a color filter placed between the liquid crystal layer and the bottom transparent substrate;

a first semi-reflector disposed between the liquid crystal layer and the color filter for transmission of light passed through the color filter and reflection of light passed through the top transparent substrate from external the liquid crystal display, the first semi-reflector having a plurality of first windows formed therethrough;

a second semi-reflector disposed under the color filter and having a plurality of second windows formed therethrough and respectively located in correspondence with the plurality of first windows of the first semi-reflector;

a top and a bottom polarizer respectively set on the outer surface of the top and the bottom transparent substrates; and a backlight system disposed below the bottom transparent substrate.

17. The bi-display mode liquid crystal display as claimed in claim 16, wherein the first semi-reflector has a reflective side facing the liquid crystal layer and the second semi-reflector has a reflective side facing the backlight system.

18. The bi-display mode liquid crystal display as claimed in claim 16, wherein the second semi-reflector is located between the color filter and the bottom transparent substrate.

19. The bi-display mode liquid crystal display as claimed in claim 18, wherein the second semi-reflector is formed of a multilayer dielectric reflector or a thin film metal reflector.

20. The bi-display mode liquid crystal display as claimed in claim 18, wherein the color filter has a plurality of color blocks each with a plurality of apertures disposed in non-aligned relationship with the plurality of first and second windows of the first and second semi-reflectors.

* * * * *